3,156,009
DEVOLATILIZING EXTRUDER
Clarence M. Alsys, Park Forest, Ill., assignor to Standard Oil Company, Chicago, Ill., a corporation of Indiana
Filed Dec. 30, 1960, Ser. No. 79,742
2 Claims. (Cl. 18—12)

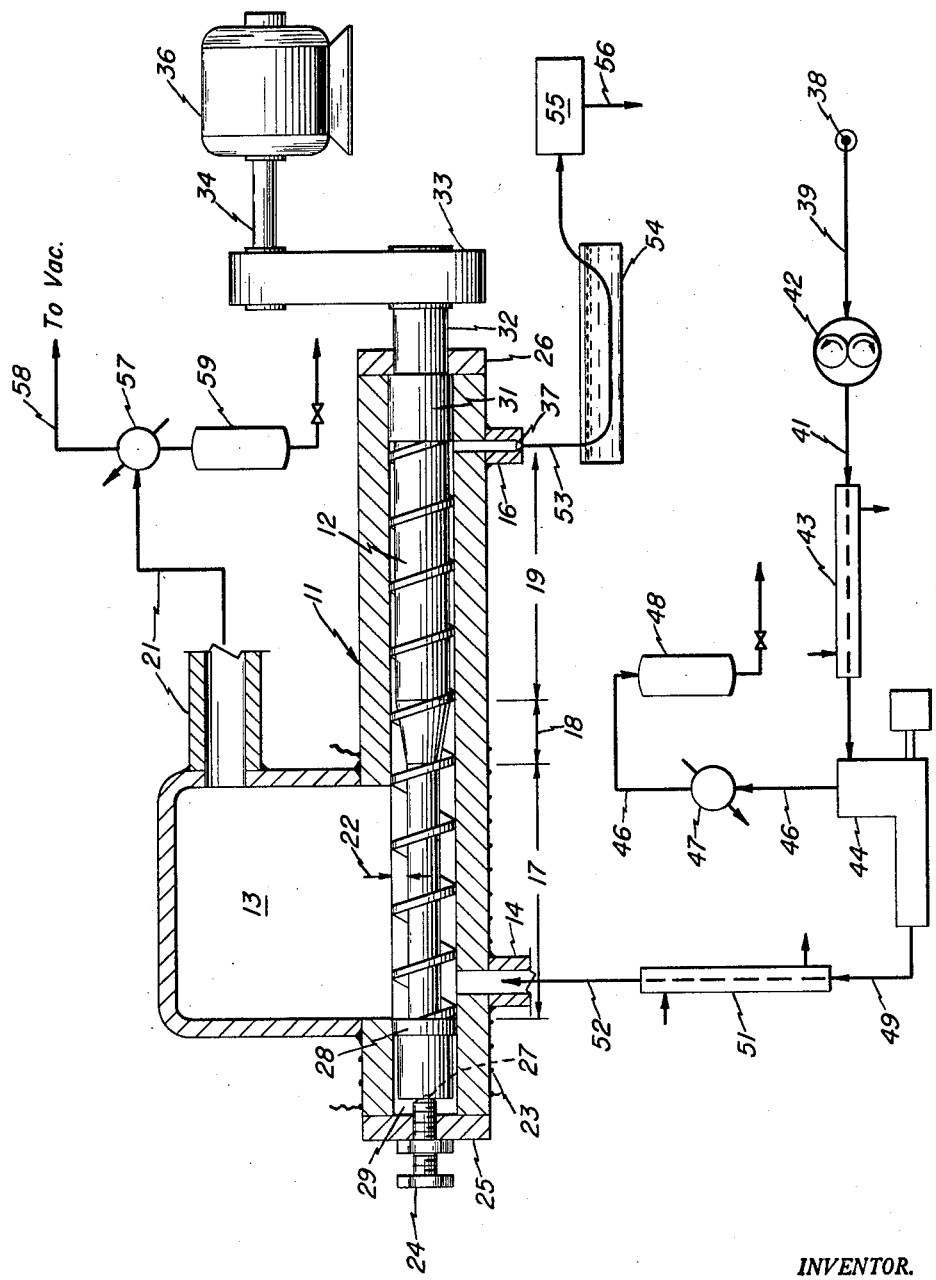

This invention relates to a system for making a substantially solvent-free polymer from an initial solution of the polymer in a volatile solvent. More particularly, the invention provides improvements in a screw extruder apparatus to enable such apparatus to be used in the aforesaid system.

Screw extruders may be used for removing volatile material from normally solid high polymers, but many of these are unduly complex (e.g. the twin screw extruders of Belgian Patent 547,648, U.S. 2,441,222, U.S. 2,615,199, and the special screws and barrels of U.S. 2,829,399). Heretofore, these screw extruders have been unable to make polymer of less than 0.1 weight percent volatiles content where the polymer is heat sensitive; the high vacuums required for adequate devolatilization are attainable only with extreme difficulty, and then often by the employment of expensive vacuum seals and complex multi-flight extrusion screws.

According to the optimum practice of the present invention, there is provided a screw extruder capable of yielding substantially solvent-free—less than 1% and frequently less than 0.1%—normally-solid polymer, which extruder can be operated at high vacuum and at temperatures above the melting point but below the decomposition temperature of the polymer. This is accomplished, pursuant to the invention, by reversing the normal mode of construction of screw extruders. That is, instead of driving the extrusion screw at the polymer inlet and devolatilizing zone end, the screw is driven at the downstream end. Thus the extruding polymer provides a vacuum seal for the devolatilizing zone, and correspondingly a high vacuum may be applied to this zone without fear of leakage and without need for complex vacuum seals and multi-flight screws.

The provision of a high vacuum devolatilizing extruder also enables substantially solvent-free polymer to be obtained from a dilute solution of polymer in solvent. In the preparation of many polymers such as polyethylene, the corresponding monomer is reacted at high temperature in the presence of suitable catalysts, and the resultant reaction mixture will contain, say, 5–30 weight percent polymer in an inert reaction medium, together with unreacted monomer and catalyst. After suitable removal of monomer and catalyst, the remaining solution must be treated for separation of solvent and recovery of polymer. This is accomplished, according to the invention, by flashing the solution at a temperature above the polymer's melting point but below its decomposition temperature at a low pressure, e.g. atmospheric or somewhat above, to reduce the solvent content to about 10–60 weight percent, advantageously about 10–30 weight percent. This flashing advantageously is conducted in a conventional devolatilizing extruder, utilizing the extrusion screw as a pump to feed a second devolatilizing extruder.

Final devolatilizing is accomplished in a second extruder operated at high vacuum, e.g. less than about 20 millimeters mercury absolute, and preferably in the range of about 0.1–10 millimeters, e.g. 0.5–5.0 mm. Feed to this extruder may be preheated, and the extruder itself may include suitable means for heating the polymer-solvent solution while in the devolatilizing zone. To avoid "bridging" of polymer in the devolatilizing zone vapor outlet, polymer and solvent is admitted near the bottom of this zone; to obtain a high degree of solvent removal the vapor outlet has a cross section in a plane parallel to the extrusion screw greater than the cross section of the screw.

By the aforesaid improvement or improvements a substantially solvent-free polymer may be recovered without the employment of inordinately complex or expensive apparatus. Moreover, higher vacuums may be applied than were heretofore possible on similar equipment.

The invention in its various aspects will be more fully illustrated in the ensuing description which is to be read in conjunction with the attached single drawing showing the cross sectional plan view of a reverse drive devolatilizing extruder and, schematically, a complete system for recovering polymer and solvent from an initially dilute solution.

In the example depicted in the drawing, high density polyethylene is recovered from its solution in "odorless mineral spirits," a highly acid treated refined kerosene consisting essentially of $C_{10}$–$C_{12}$ paraffins. It will be understood that other normally solid polymers and volatile liquid solvents may similarly be employed, although the particular conditions will need be varied to accommodate different physical and chemical properties of the respective ingredients.

The devolatilizing extruder consists essentially of a barrel section 11, rotatable threaded screw 12, a vapor outlet 13, polymer-solvent inlet 14, and polymer outlet 16. The thread extrusion screw 12 is divided into three portions; devolatilizing zone 17, compression zone 18, and extrusion zone 19. In the first of these zones there is a flashing of liberated solvent vapors as the molten polymer-solvent solution is exposed to the relatively high vacuum of vapor outlet 13, as maintained via vacuum line 21, and the combined action of low pressure, applied heat, and the kneading action of screw 12 effects devolatilizing.

It will be seen in the drawing that the flight depth 22 of screw 12 is greatest in the devolatilizing zone, progressively decreases in compression zone 18, and is at a minimum in extrusion zone 19. This flight or thread depth on the impelling screw 12 will vary depending upon the inner diameter of barrel 11, and for extruder barrels in the range of 2 to 12 inches, the flight depth in devolatilizing zone 17 may be in the range of about 0.3 to 4 inches, tapering down to the order of 0.05 to 0.2 inch in extrusion or expulsion zone 19.

Devolatilizing zone 17 may have a length of about 3 to about 10 or more barrel diameters, with longer lengths being conducive to a more solvent-free final polymer. The vapor outlet 13 should be of as large a cross section as possible, as determined in a plane parallel to the axis of extrusion screw 12 and normal to the axis of vapor outlet 13, and illustratively has a cross section area of between about 1.5 and about 3 times the axial cross sectional area of barrel 11 or extruder screw 12.

Extrusion zone 19 may have a length of from about 3 to about 30 screw diameters, depending upon the characteristics of the polymer and of the solution. A more concentrated solution and/or a higher molecular weight polymer generally requires a shorter extrusion zone length within the foregoing range.

Devolatilizing zone 17 may be provided with heating means illustrated by electrical resistors or "Calrods" 23 imbedded therein and suitably covered by an external insulating jacket, not shown. Alternatively, other heating means such as steam or Dowtherm (diphenyl-diphenyl oxide) may be substituted for the electrical resistors. If desired, an electrical heater may be imbedded in extrusion screw 12 to provide additional heat for solvent and polymer in extrusion zone 17.

Since screw 12 is subjected to high rotary and axial loads, heavy duty bearings are provided at each end. These are illustrated by thrust bearing 24 at the polymer inlet end and thrust bearing 26 at the outlet end. Bearing 24 is exemplified by an adjustable jack screw threaded into end plate 25 and engaging screw 12 at a recessed portion 27. Polymer and solvent are prevented from entering the region of bearing 24 by means of a shoulder 28 fitting the inner portion of barrel 11; improved isolation may be obtained by providing a small stream of solvent as a lantern gland for region 29.

At the outlet end of the screw extruder, collared portion 31 of extrusion screw 12 fits the inner diameter of barrel 11 so as to seal bearing 26 against polymer leakage. Through bearing 26 passes shaft portion 32 of extruder screw 12. This is coupled to a suitable reduction gear 33, which in turn is connected via shaft 34 to an electric motor or other drive 36.

Polymer-solvent melt is admitted to the screw extruder via inlet line 14. It has been found highly advantageous to have this line enter near the bottom in order to permit devolatilized polymer to be picked up and transported via extrusion screw 12 and avoid bridging or build-up of polymer in vapor outlet 13. Devolatilized polymer is discharged via outlet 16, which may be provided with one or more die holes 37 to extrude the polymer in one or more strands of any desired cross sectional shape, e.g. round, star, etc.

In the employment of the inventive extruder in an overall polymer recovery system adapted for obtaining high density polyethylene with less than 0.1% volatiles (odorless mineral spirits), a 17.25 weight percent solution is obtained from source 38 and pumped via lines 39 and 41 by means of pump 42, which is advantageously of the positive displacement, e.g. gear, type. Heating jacket 43, supplied with Dowtherm or the like, heats the solution so that it enters the devolatilizing zone of a conventional screw extruder 44 at a temperature within the range of about 400 to about 600, e.g. 550° F., which temperature is above the melting point but below the decomposition temperature of polyethylene.

In devolatilizing extruder 44 there is maintained a relatively low pressure to permit at least a major portion of the solvent to flash off and be removed as a vapor; further heating of the polymer may be furnished by employing heaters in the flash zone of devolatilizing extruder 44. The pressure here is relatively low, e.g. substantially atmospheric (about 12–20 p.s.i.a.) or somewhat higher. Vapors from extruder 44 are withdrawn via vapor line 46, are condensed in condenser 47, and the condensate is collected in receiver 48 for ultimate return to the polymerization process.

The extrusion screw of extruder 44 serves as a pump to transfer the now concentrated polymer solution via line 49, heater 51, and line 52 to the inlet 14 of the second devolatilizing extruder. This solution has a polymer content of between about 10 and about 60 weight percent, optimally about 10–30 weight percent, although in the current example it is 49.3 weight percent. Its temperature, likewise above the polymer melting point but below its decomposition temperature, is in the range of about 400–6000, more advantageously about 450–500, e.g. 491° F.

In devolatilizing zone 17 it is exposed to a relatively high vacuum, typically below about 20 millimeters mercury absolute, e.g. 2.5 millimeters mercury for a period of approximately 13 seconds; this period may range from, say, 5 seconds or less to as much as 1 minute or more, depending upon the inlet and outlet solvent concentrations, devolatilizing zone temperature, axial length of vapor outlet 13, and the rate of polymer travel. In the example, the residence time is 13 seconds and the vapor temperature is 450° F.; extruder screw 12 has a diameter of 10 inches and a length of 14 diameters.

The extruded polymer leaves die 37 of polymer outlet 16 as strands 53, which are quenched in cooling trough 54 and chopped by chopper 55 to become high quality pellets of commerce 56.

Returning to devolatilizing zone 17, the vapor outlet 13 communicates with vacuum line 21 which leads to condenser 57, a vacuum line 58, and condensate receiver 59. Solvent removed in devolatilizing zone 17 is collected in receiver 59, from whence it is combined with solvent in receiver 48 and returned to the polymerization process.

To prove out the inventive system, a pilot plant extruder was constructed with an 1.010 I.D. barrel diameter, a 4 inch devolatilizing zone having a 0.5 inch root diameter, a 1 inch compression zone, and a 5 inch extrusion zone having a 0.800 root diameter. Vapor outlet 13 was 3 inches long and had a dimension of approximately ¾ inch where it entered barrel 11. The screw threads were ⅛ inch thick and had an angle of 17.8° with respect to the screw axis.

This extruder was supplied with a 20% solution of polymer having a melt index of approximately 1.0, the solvent being odorless mineral spirits. This solution was preheated to about 500° F., and the barrel was heated to about 455–460° F. At a vacuum of about 2 mm. mercury absolute, the following results were obtained:

Table

|  | Screw, r.p.m. | Product Rate, Lb./Hr. | Volatiles, Wt. percent |
| --- | --- | --- | --- |
| ⅛ inch Die | 189 | 1.6 | 0.15 |
|  | 234 | 2.1 | 0.05 |
| ¼ inch Die | 180 | 3.4 | 0.08 |
|  | 234 | 3.5 | 0.72 |

There is no noticeable leakage of air into the devolatilizing zone through the bearings. It was also found that a more rigid coupling was obtained by supplying power to the thicker end of the extrusion screw.

Thus it is apparent that the invention provides an outstanding system for continuously making a substantially solvent-free polymer. While the invention has been described in conjunction with specific embodiments thereof, it is evident that these are by way of illustration only, and that various alternatives, modifications and variations will be apparent to those skilled in the art in light of the foregoing description. Accordingly, it is intended to embrace all such alternatives, modifications and variations as fall within the spirit and broad scope of the appended claims.

I claim:

1. Apparatus for removing solvent from normally solid polymer at temperatures above the melting point but below the decomposition temperature of the polymer, which apparatus comprises: a screw extruder having a barrel with an inlet for solvent-containing polymer and a polymer outlet, means for introducing solvent-containing polymer into said inlet, a threaded extruding screw rotatable in said barrel, the flight depth of said screw being greater at the inlet than at the polymer outlet, a solvent vapor outlet positioned near said polymer inlet and adapted for the passage therethrough of solvent vapors from said barrel, means for maintaining a vacuum on said solvent vapor outlet, means for heating the introduced polymer and solvent to permit vaporization of the solvent, and drive means coupled to said extruder screw at the polymer outlet end of said barrel and whereby extruding under pressure provides a vacuum seal for said extruder screw at the polymer outlet.

2. An apparatus for obtaining a substantially solvent-free normally-solid polymer from a solution thereof in a volatile liquid solvent which comprises: a screw extruder having a barrel provided with a polymer inlet near one end, a polymer outlet near the opposite end, and an evacuable solvent vapor outlet connected to said barrel near said inlet, an extruder screw rotatable in said barrel, the flight depth of said screw being greater at the inlet end than at the polymer outlet end of said barrel, drive means coupled to said extruder screw at the polymer outlet end whereby extruding polymer under pressure provides a vacuum seal for said evacuable solvent vapor outlet, the inlet end of said barrel being otherwise closed, and means for heating the polymer and solvent while in the region of said evacuable solvent vapor outlet to thereby vaporize the solvent.

References Cited in the file of this patent

UNITED STATES PATENTS

| | | |
|---|---|---|
| 1,614,526 | Lambie et al. | Jan. 18, 1927 |
| 2,369,553 | Fields | Feb. 13, 1945 |
| 2,458,068 | Fuller | Jan. 4, 1949 |
| 2,622,469 | Gray | Dec. 23, 1952 |
| 2,833,750 | Vickers | June 17, 1953 |
| 2,836,851 | Holt | June 3, 1958 |
| 3,023,456 | Palfey | Mar. 6, 1962 |
| 3,035,306 | Rossiter | May 22, 1962 |

FOREIGN PATENTS

| | | |
|---|---|---|
| 450,668 | Canada | Aug. 24, 1948 |